United States Patent [19]

Sakata et al.

[11] Patent Number: 4,734,877
[45] Date of Patent: Mar. 29, 1988

[54] VECTOR PROCESSING SYSTEM

[75] Inventors: Akiharu Sakata, Kokubunji; Shunichi Torii, Musashino; Yoshifumi Takamoto, Hachioji, all of Japan

[73] Assignee: Hitachi, Ltd., Tokyo, Japan

[21] Appl. No.: 15,625

[22] Filed: Feb. 17, 1987

[30] Foreign Application Priority Data

Mar. 10, 1986 [JP] Japan .................................. 61-50378

[51] Int. Cl.⁴ .......................................... G06F 15/347
[52] U.S. Cl. ..................................... 364/730; 364/900
[58] Field of Search .............................. 364/730, 900

[56] References Cited

U.S. PATENT DOCUMENTS 4,525,796 6/1985 Omoda et al. ...................... 364/730
4,641,275 2/1987 Hatakeyama et al. .............. 364/730
4,661,900 4/1987 Chen et al. ......................... 364/730

FOREIGN PATENT DOCUMENTS

0044562 1/1982 European Pat. Off. ............ 364/730
2130767 6/1984 United Kingdom ................ 364/730

*Primary Examiner*—Howard A. Birmiel
*Attorney, Agent, or Firm*—Antonelli, Terry & Wands

[57] ABSTRACT

A vector processing system including a main storage for storing vector instructions and vector data, an instruction register for holding a vector instruction read out of the main storage, a decoder for decoding the vector instruction held in the instruction register, and an execution unit, operative to implement a vector operation in response to an output of the decoder, including a facility which, when a sort instruction inclusive of a vector starting address, increment switching parameter and an operation switching parameter has been set up in the instruction register, implements a sorting process specified by the instruction for vector data stored in the main storage, the facility including a circuit in which the operation switching parameter is set and which produces an operation switching signal in compliance with the number of operations and the position of a vector element to be operated, a circuit in which the increment switching parameter is set and which produces an increment switching signal in compliance with the position of the vector element to be operated, a fetch/store address generating circuit in which the vector starting address and increment switching parameter are set and which in compliance with these settings generates addresses of vector elements to be sorted for reading out and writing in the main storage successively in an incremental manner and generates the addresses with their incremental value being changed in compliance with the increment switching signal, and an operation circuit which implements an operation for sorting vector elements read out of the main storage in compliance with the operation switching signal, the facility implementing sorting for all elements of vector data to be sorted when the sort instruction is set up in the instruction register.

3 Claims, 8 Drawing Figures

VECTOR PROCESSING SYSTEM

BACKGROUND OF THE INVENTION

1. FIELD OF THE INVENTION

This invention relates to vector processing system and, particularly, to a vector processing system suitable for vector process used frequently in data base processing in which the type of operation is changed during a process.

2. DESCRIPTION OF THE PRIOR ART

In a vector processing system, with vector data being sorted in two groups, the bitonic method for sorting the whole vector data has conventionally been implemented on a software basis. The bitonic method is as follows. For example, when it is intended to sort elements of data in the ascending order of data elements with the assumption that the left half of the data is aligned so that its contiguous data elements have an equal value or values in the increasing (i.e., ascending) order and the right half of the data is aligned so that its contiguous data elements have an equal value or values in the decreasing (i.e., descending) order, an element of the right-hand data is compared with the counterpart of the left-hand data, e.g., comparison between the first element in the right-hand data and that in the left-hand data, and if the element value of the right-hand data is equal to or larger than the element value of the left-hand data, the element position is left unchanged, or if the comparison result is opposite, the element positions are exchanged and the above operation is implemented for all data elements. Subsequently, each of the right-hand and left-hand data is further divided into two parts and the above operation is carried out. These operations are repeated until the operation for two adjoining elements completes. For sorting data elements in the descending order, positions of elements are changed reversely in the above operation. According to the bitonic sorting method, each element in the left hand part of data is made equal to or larger than any element in the right half part in the case of the above example, and sorting is carried out by continuing the operation up to the operation for two elements. Generally, in sorting vector data, it is divided into 2-element groups and sorting is carried out in the ascending order for even-numbered groups (counted from one end) and in the descending order for odd-numbered groups. Subsequently, sorting is carried out for 4-element groups, in the ascending order for odd-numbered groups and in the descending order for even-numbered groups. In this way, the final sorting result is reached, and the sorting operation in each stage can be implemented by the bitonic method.

Sorting in the bitonic method on a hardware basis poses the following problems. Vector data to be sorted by the bitonic method includes, at random, parts which output elements that are not larger in value than an input vector element to be compared and parts which output elements that are not smaller in value than the input vector element. Conventional vector processing processors cannot cope with these cases by one type of instruction. For example, in processor HITAC S-810, as described in its manual on pages 83, 117 and 119, it is necessary for the sorting to use two instructions including the instruction for testing whether one element is equal to, larger than, or smaller than another element and the instruction for testing whether one element is equal to, smaller than, or larger than another element, and in this case vector data to be sorted must be divided into a part outputting elements that are not larger than an input element and a part outputting elements that are not smaller than the input element, and the instructions must be executed separately for these parts. Execution of a vector instruction necessitates initial setting and readout of operation result, and execution of two types of instruction results in doubled overhead. In addition, the performance of sorting falls as the vector length decreases. As it is described in publication entitled "Sorting and Searching", Vol. 3, Chapter 5, pp. 232-233, by Knuth, as the algorithm of the bitonic sorting method advances the length of a divided vector becomes shorter and the performance falls significantly.

In the bitonic sorting method of the case where vector data is divided and bitonic sorting is implemented for each division and of the case where sorting of one division is followed by sorting of the next division, the increment of the reading and writing address for each element of vector must be changed when the division to be operated changes. In conventional vector processing systems, the address increment is constant during the execution of one vector instruction, and therefore the need of executing a different vector instruction at each change of the address increment value causes an increased overhead such as for initial setting.

SUMMARY OF THE INVENTION

An object of this invention is to provide a vector processing system which performs the vector sorting process, in which the type of operation and the increment in addressing vary, without dividing the original vector and without suspending the process.

The inventive vector processing system performs sorting in the bitonic method by executing a single instruction with its format including a starting address, operating parameter for changing the type of operation and parameter for changing the address increment. The instruction execution section of the system for executing an instruction read out of the main storage depending on the decoded result of the instruction comprises an operation switching signal generating circuit which has an initial setting of the operation parameter and produces an operation switching signal in accordance with the position of the vector element to be operated and the number of times of the operation, an address increment switching signal generating circuit which has a setting of the increment changing parameter and produces an address increment switching signal in accordance with the number of vector elements operated, and a fetch/store address generating circuit which has a setting of the starting address and address increment changing parameter and produces addresses of two elements to be compared with each other using the starting address and address increment changing parameter, produces further address of each element to be compared next by incrementing the address sequentially, and produces an address of the element to be compared next by changing the increment in accordance with the increment switching signal provided by the increment switching signal generating circuit when the division of data to be operated changes, and operates to read out two elements to be compared with each other by addressing the main storage as indicated by the fetch/store address generating circuit and write the elements continuously in the ascending or descending order depending on the operation switching signal from the operation switching signal generating circuit into the address locations where the element have been read out.

The present invention enables bitonic sorting for all elements of vector data by executing a bitonic instruction while changing the operation and address increment value.

According to this invention, the type of operation and address increment can be changed during the execution of a bitonic instruction and the process is not suspended during the bitonic sorting for all elements of vector data, whereby the system overhead for the initial setting and operation result readout in executing vector instructions can be reduced and the process time can also be reduced.

BRIEF DESCRIPTION OF THE DRAWINGS

These and other objects and advantages of the present invention will become more apparent from the following detailed description taken in conjunction with the accompanying drawings, in which.

DESCRIPTION OF THE PREFERRED EMBODIMENT

Figure 1:
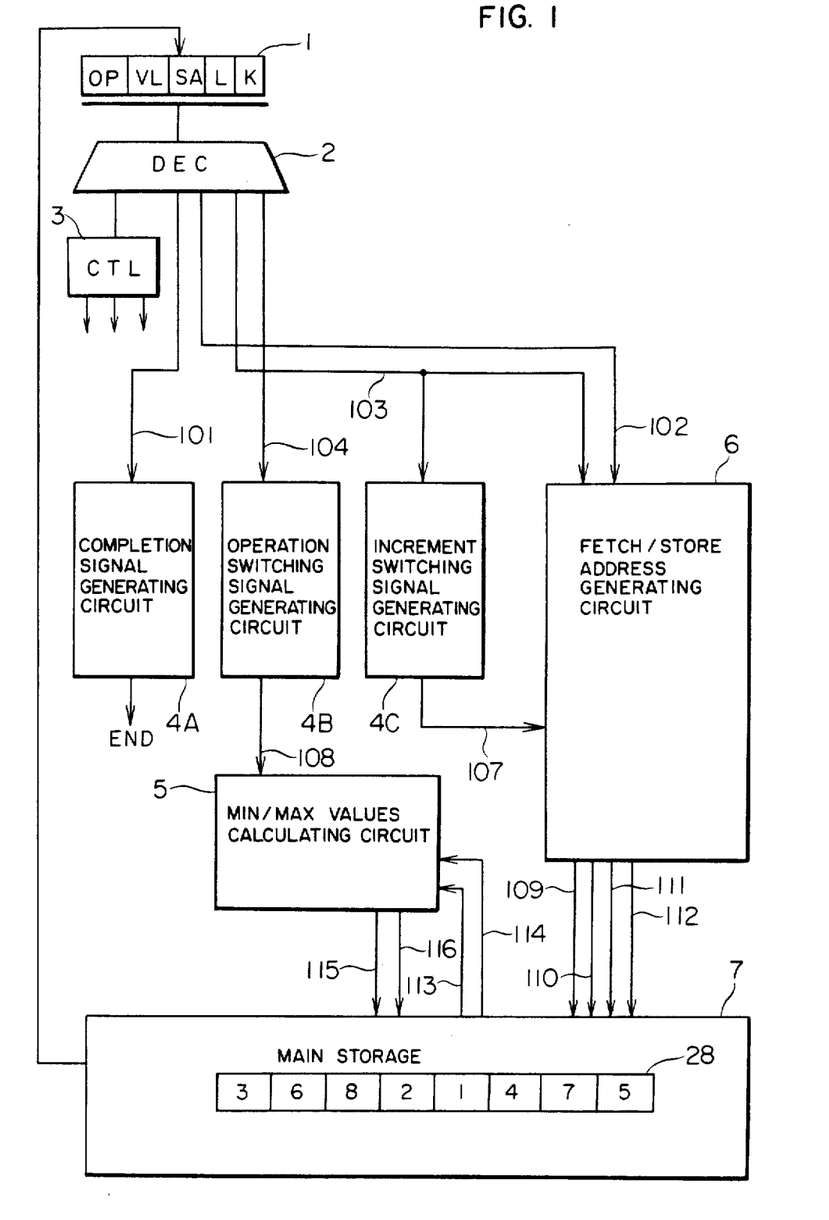
FIG. 1 is a block diagram of the vector processing system embodying the present invention.

The arrangement of the vector processing system embodying the present invention is shown in FIG. 1. In FIG. 1, reference number 1 denotes an instruction register, 2 a decoder, 3 an instruction controller, 4A a signal generating circuit, 4B an operation switching signal generating circuit, 4c an increment switching signal generating circuit, 5 a minimum value and maximum value calculating circuit, 6 a fetch/sorte generating circuit, and 7 a main storage.

The main storage 7 stores instruction words and data, and the instruction register 1 stores an instruction read out of the main storage 7. An instruction word consists of an OP code for specifying the type of operation, a vector element length (VL) part, a vector starting address (SA) part, an increment switching parameter (L) part, and an operation switching parameter (K) part. The decoder 2 decodes the instruction held in the instruction register 1. The instruction controller 3 receives the result of decoding by the decoder 2 of the OP code of the instruction held in the instruction register 1, and implements control for the execution of the instruction and control of data flow and timing. The vector length (VL) and the like in the instruction are decoded by the decoder 2, and the results are delivered to system sections which need them for instruction execution.

Shown in FIG. 1 is the distribution of information such as the vector element length VL from the decoder 2 for the case where the SORT instruction is held in the instruction register 1.

The increment switching signal generating circuit 4C receives and holds the increment switching parameter L sent from the decoder 2 over the line 103, and the content of the circuit 4C is decremented by one each time data is fetched from the main storage 7 by the fetch/store address generating circuit 6. When the content of the circuit 4C has reached zero, i.e., when elements of L in number have been fetched, the increment switching signal is sent to the fetch/store address generating circuit 4C over the line 107. At this time point, the parameter L is set in the fetch/store address generating circuit 6. The operation switching signal generating circuit 4B receives and holds the operation switching parameter K and from the decoder 2 over the line 104, and its content is decremented by two each time when data is fetched from the main storage. When the content of the circuit 4B has reached zero, the operation switching signal is sent to the minimum value and maximum value calculating circuit 5. The completion signal generating circuit 4A receives and holds the vector element length VL sent from the decoder 2 over the line 101, and its content is decremented by two each time data is fetched from the main storage. When the content of the circuit 4A has reached zero, a signal indicative of the completion of operation for all elements of the vector data is sent out. The reason for the decrement by two at each data fetch is that an operation for two elements takes place at each data fetching.

The fetch/store address generating circuit 6 is given by the decoder 2 the starting address SA and increment switching parameter L, and it makes access to the main storage 7 through the lines 109 and 110 using initially the starting address SA for reading one element and the address SA added by the parameter L for reading another element. The elements read out of the main storage are sent to the minimum value and maximum value calculating circuit 5 over the lines 113 and 114. For example, when bitonic sorting is implemented for the elements of vector 28 shown in the block of the main storage 7 in FIG. 1, with the starting address SA being the address of element 3 and parameter L being 2, elements 3 and 8 are sent to the minimum value and maximum value calculating circuit 5 over the lines 113 and 114. The minimum value and maximum value calculating circuit 5 compares the fetched elements and, depending on the operation switching signal from the operation switching signal generating circuit 4B, and in the case of arranging the elements in the ascending order, sends the fetched elements without any process to the main storage 7 over the lines 115 and 116 if the comparison result indicates that the elements have been in the ascending order, or with their positions being replaced if the comparison result indicates that they have been in the descending order. The similar processing takes place in the case of arranging two elements in the descending order. In writing the elements, the fetch/store address generating circuit 6 sends the addresses, which have been sent over the lines 109 and 110 at reading, as write addresses over the lines 111 and 112.

The fetch/store address generating circuit 7 subsequently reads out elements from the main storage 7 by incrementing the previous read addresses by one, and thereafter the same operation continues. In case of proceeding bitonic sorting by dividing a vector, e.g., when carrying out bitonic sorting for the left half elements 3, 6, 8 and 2 of the vector 28 in FIG. 1, and thereafter carrying out bitonic sorting for the right half elements 1, 4, 7 and 5 of the vector, the increment switching signal generating circuit 4C sends the increment switching signal over the line 107 to the fetch/store address generating circuit 7 when the part of data to be sorted changes, and in response to the signal the fetch/store address generating circuit produces new read addresses by adding the parameter L incremented by one to the former read addresses. For implementing the above-mentioned sorting for the vector 28, read addresses for elements 1 and 7 are produced following those for elements 6 and 2.

With a bitonic sorting instruction inclusive of the vector starting address SA, increment switching parameter L and operation switching parameter K being established, the system arrangement of FIG. 1 performs bitonic sorting for all elements of the vector by switching the increment value and operation through the execution of the single instruction, whereby system overhead such as for initial setting can be reduced significantly and the process time can be minimized as compared with the conventional vector processing system in which instructions are executed repeatedly each time the parameter and operation are changed.

Figure 7:
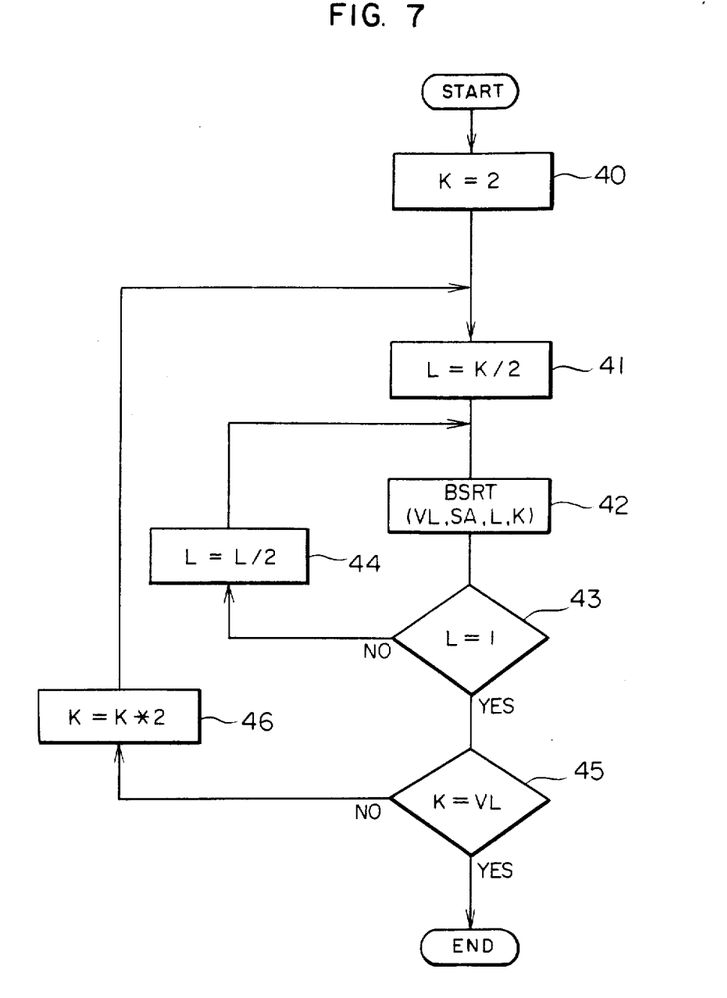
FIG. 7 is a flowchart showing the sorting process for the whole vector data.

Sorting of vector data is implemented by executing a plurality of bitonic sorting instructions with individual values for L and K together with other program processing, as will be described later with reference to FIG. 7.

Next, bitonic sorting for the vector 28 in the main storage 7 will be described. By being addressed by the fetch/store address generating circuit 6 through the lines 109 and 110, elements 3 and 8 of the vector 28 are read out to the minimum value and maximum value calculating circuit 5. The circuit 5 compares the elements 3 and 8 (it is assumed that elements are arranged in the ascending order), and the elements 3 and 8 are sent back over the lines 115 and 116, respectively, to the original storage locations in accordance with the addresses provided by the fetch/store address generating circuit 6 over the lines 111 and 112. Elements 6 and 2 of the vector 28 are treated in the similar manner, but in this case they exchange the position since the element 2 is sent over the line 115 and the element 6 is sent over the line 116 from the minimum value and maximum value calculating circuit 5. Namely, the vector 28 has its elements 2 and 6 replaced with each other. Subsequently, the increment switching signal generating circuit 4C sends the signal to the fetch/store address generating circuit 6 over the line 107, causing the circuit 6 to switch the increment value and produce addresses for elements 1 and 7. The elements 1 and 7 are fed to the minimum value and maximum value calculating circuit 5, but in this case the operation switching signal generating circuit 4B provides a signal over the line 108 to switch the element arrangement to the descending order, and consequently the minimum and maximum outputs are replaced. On this account, the element 7 is sent over the line 115, and the element 1 is sent over the line 116. These elements are stored in the main storage 7 by being addressed by the fetch/store address generating circuit 6. As a result, the vector 28 has its elements 1 and 7 replaced with each other.

Figure 2:
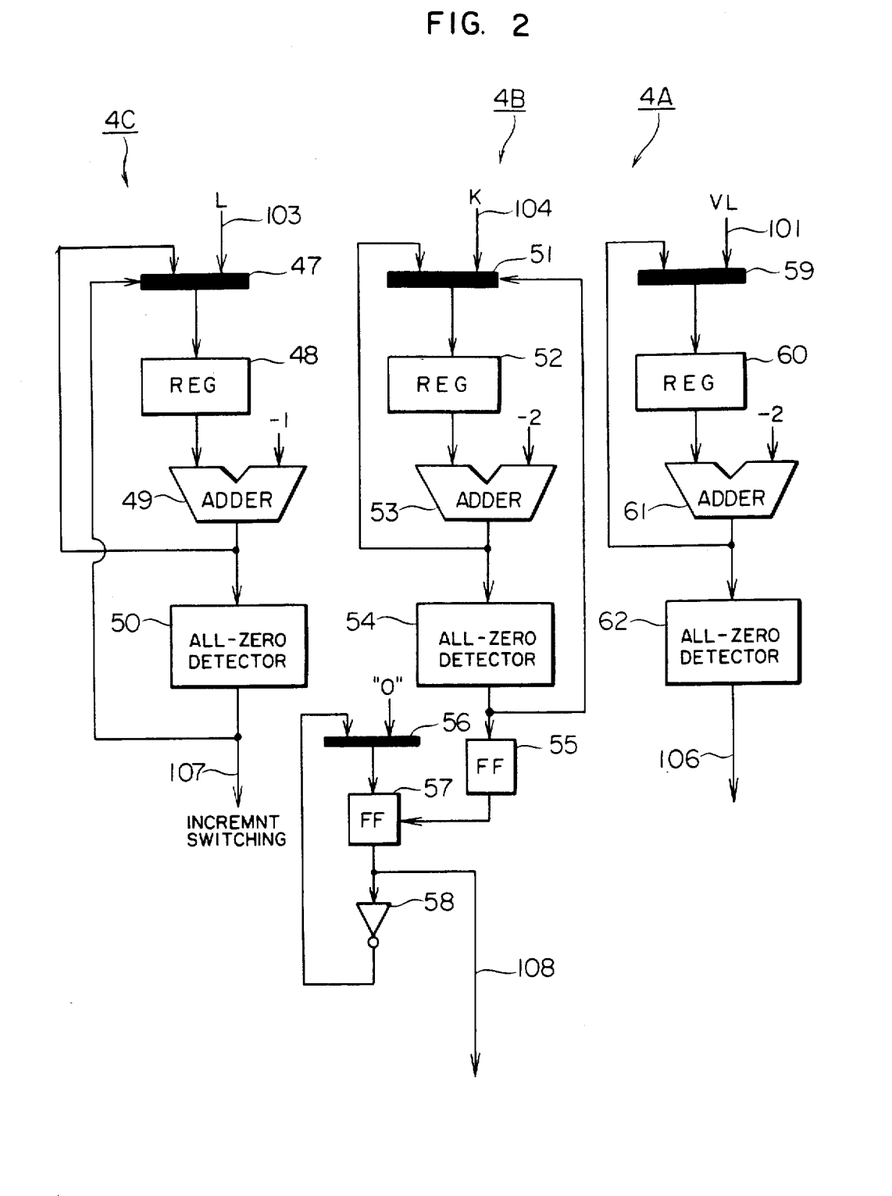
FIG. 2 is a diagram used to explain the operation switching signal generating circuit, increment switching signal generating circuit, and completion signal generating circuit in the embodiment of FIG. 1.

The details of the completion signal generating circuit 4A, increment switching signal generating circuit 4C and operation switching circuit 4B will be described using FIG. 2. In the figure, reference numerals 47, 51, 56 and 59 denote selection circuits, 48, 52 and 60 counter registers, 49, 53 and 61 count advancing adders, and 50, 54 and 62 zero detectors. Symbol 55 denotes a flip-flop, 57 an operation switching signal register, and 58 a NOT circuit.

The increment switching signal generating circuit 4C will be described. The circuit 4C, shown in the leftmost section of FIG. 2, receives a value L sent over the line 103, and it is held in the register 48. The register 48 has its content decremented by one by the adder 49 at each element fetching. After elements of 2L in number have been fetched, the adder 49 sends a 0-signal to the zero detector 50, which in turn issues a signal. In response to this signal the value L is entered again to the register 48, and the fetch/store address generating circuit 6 in FIG. 1 switches the increment value in response to the signal sent over the line 107. The occurrence of increment switching is dependent on the vector element number.

The operation switching signal generating circuit 4B will be described. The circuit 4B, shown in the central section of FIG. 2, receives a value K sent over the line 104, and it is held in the register 52. At this time, the flip-flops 57 and 55 are in a cleared state. The register 52 has its content decremented by two by the adder 53 at each element fetching. After elements of K in number have been fetched, the adder 53 sends a 0-signal to the zero detector 54, which in turn issues a signal to the flip-flop 55 and at the same time in response to this signal the value K is entered to the register 52. A delayed signal provided by the flip-flop 55 causes the flip-flop 57 to send the operation switching signal to the minimum value and maximum value calculating circuit 5 in FIG. 1, and the operation is changed. The occurrence of operation switching is dependent on the vector element number and the sequential number of the operation.

The total completion signal generating circuit 4A will be described. The circuit 4A, shown in the rightmost section of FIG. 2, receives a value VL sent over the line 101, and it is held in the register 60. The register 60 has its content decremented by two at each element fetching. After whole original vector has been fetched, the adder 61 sends a 0-signal to the zero detector 62, which then issues the total completion signal. The above two signals may be produced at any time point and timeed using a retarding technique, provided that the signals are ready at the time point of switching or change-over.

Figure 3:
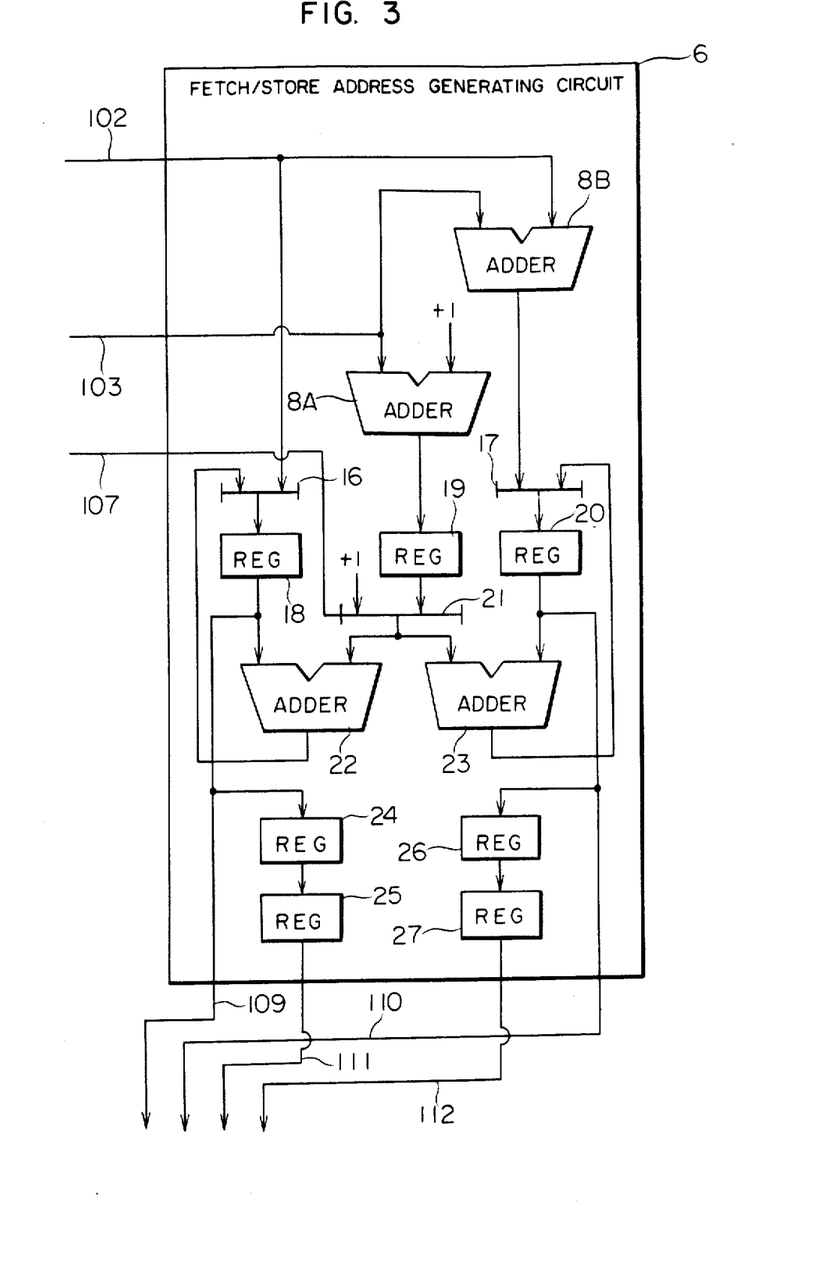
FIG. 3 is a diagram used to explain the fetch/ store address generating circuit in the embodiment of FIG. 1.

The fetch/store address generating circuit 6 will be described in detail using FIG. 3. The circuit 6 includes adders 8A and 8B, selection circuits 16, 17 and 21, an increment register 19, fetch address registers 18 and 20, address adders 22 and 23, registers 24 and 26, and store address registers 25 and 27. As for the relation of registers, the register 18 corresponds to the register 8 in the minimum value and maximum value calculating circuit 5 in FIG. 4, the register 24 corresponds to the register 9 in FIG. 4, the register 19 corresponds to the register 8 in FIG. 4, and the register 24 corresponds to the register 9 in FIG. 4.

The operation of the fetch/store address generating circuit 6 will be described by tracing the data flow. The value sent over the line 103 is added by one by the adder 8A and held in the register 18. The value SA sent over the line 102 is stored in the register 18 by way of the selection circuit 16. The value SA+L calculated by the adder 2B is stored in the register 20 by way of the selection circuit 17.

Operations during the process will be described for the case of the vector 28 in FIG. 1. Initially, the register 18 contains the address of element 3, and the register 20 contains the address of element 8. These addresses are sent over the respective lines 109 and 110 to the main storage 7 so as to specify the vector elements. The addresses are timed to the output of comparison results stored in the registers 24 and 26, and used to specify the store addresses for the operation results from the registers 25 and 27 over the lines 111 and 112. The contents of the registers 18 and 20 are incremented by one by the associated address 22 and 23. At this time, the registers 18 and 20 contain the addresses of elements 6 and 2.

The same operation as described above takes place until the fetch addresses becomes equal to the store addresses for eleemnts 6 and 2. For address updating, the content of the increment register 19 is sent to the address adders 22 and 23 by way of the selection circuit 21 by the signal sent from the increment switching signal generating circuit 4C in the execution control circuit 4A-4C over the line 107, and the contents of the address adders 22 and 23 are added to the contents of the registers 18 and 20, respectively, with the results being left in the registers 18 and 20. The registers 18 and 20 then contain the addresses of elements 1 and 7. In this way, address updating takes place at the transitional time point of one subvector to the next subvector.

Figure 4:
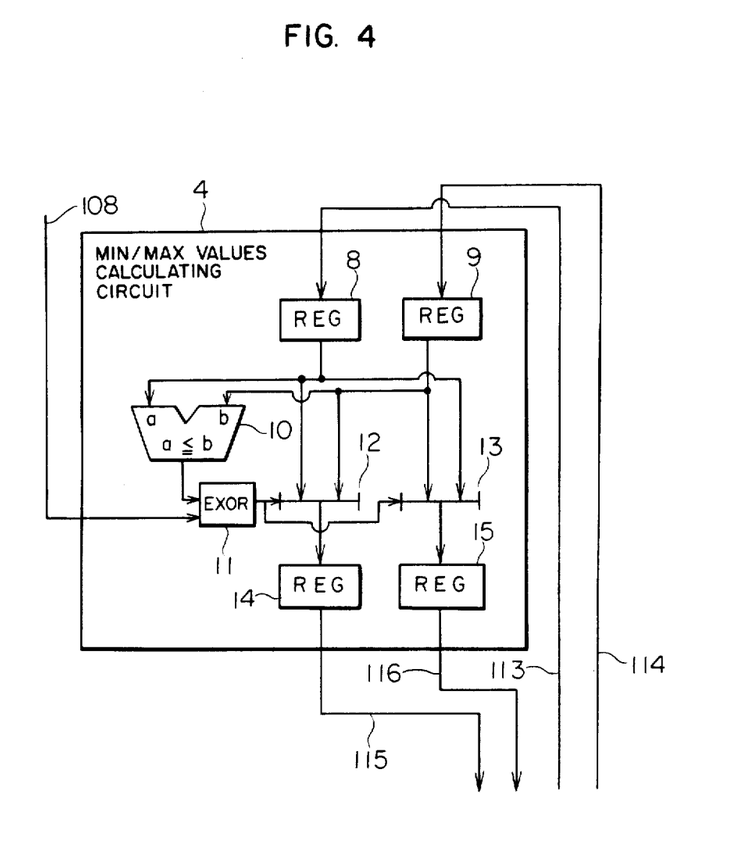
FIG. 4 is a diagram used to explain the minimum value and maximum value calculating circuit in the embodiment of FIG. 1.

The minimum value and maximum value calculating circuit 5 in FIG. 1 will be described in detail using FIG. 4. The circuit 5 includes input data registers 8 and 9, a comparator 10, an exclusive logical sum circuit 11, selection circuits 12 and 13, and output data registers 14 and 15.

The function of the minimum value and maximum value calculating circuit 5 will be described by tracing the data flow. Vector elements sent over the lines 113 and 114 are stored in the data registers 8 and 9, and then sent to the comparator 10 and to the selection circuits 12 and 13. The comparator 10 compares the value of the elements. The comparator 10 produces an output unless the content of register 8 is larger than the content of register 9, otherwise the comparator 10 produces no output. The exclusive logical sum circuit 11 takes an exclusive sum logic between the signal sent from the comparator 10 and the signal sent from the operation switching signal generating circuit 4B over the line 108. In case the exclusive logical sum circuit 11 receives no signal from the operation switching signal generating circuit 4, if the content of register 8 does not exceed the content of register 9, the exclusive logical sum circuit 11 sends no signal to the selection circuits 12 and 13, and the switching circuit 12 sends the content of register 8 to register 14 and the selection circuit 13 sends the content of register 9 to register 15. If, on the other hand, the register 8 has its content larger than that of the register 8, the comparator 10 sends a signal to the selection circuits 12 and 13, causing the selection circuit 12 to send the content of register 9 to register 8 and the selection circuit 13 to send the content of register 8 to register 12. In any case, the content of register 14 is not larger than the content of register 15. In another case in which the exclusive logical sum circuit 11 has a signal sent from the operation switching signal generating circuit 4B, operation opposite to those described above take place, and the content of register 15 does not exceed the content of register 14. The contents of the registers 14 and 15 are sent over the respective lines 115 and 116 and stored in the main storage 7.

Figure 5:
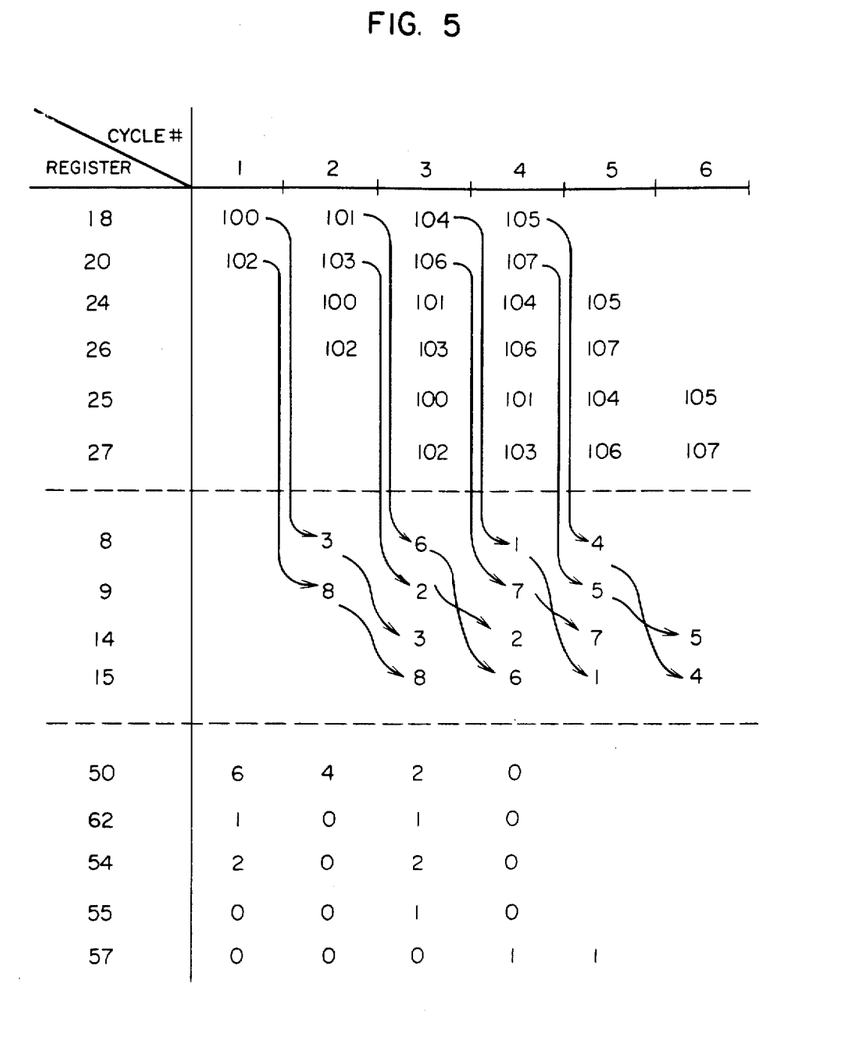
FIG. 5 is a timing chart showing an example of bitonic sorting in the embodiment of FIG. 1.

The storage of the pipeline will be described using FIGS. 1 and 5. It is assumed that the vector data 28 in FIG. 1 is stored from top address 100 and one operation cycle consists of one stage in this embodiment.

In the first cycle, the address registers 18 and 20 contain addresses 100 and 102 for elements 3 and 8, respectively, the zero detectors 62, 54 and 50 receive values 6, 1 and 2, respectively, and the operation switching registers 55 and 57 both contain zero.

In the second cycle, the address registers 18 and 19 contain addresses 100 and 103 for elements 6 and 2, respectively, the registers 24 and 26 contain 100 and 102, respectively, the data registers 8 and 9 contain 3 and 8, respectively, the zero detectors 62, 50 and 54 receive values 4, 0 and 0, respectively. The zero detector outputs an increment switching signal, the zero detector 54 outputs an auxiliary signal for the operation switching signal, and the flip-flops 55 and 57 both retain zero.

In the third cycle, the address registers 18 and 20 contain addresses 104 and 106 for elements 1 and 7, respectively. The registers 24 and 26 contain 101 and 103, respectively, and the registers 25 and 26 contain addresses 100 and 102 for storing elements 3 and 8, respectively. The data registers 8 and 9 contain 6 and 2, respectively, and the registers 114 and 115 contain 3 and 8, respectively. The zero detectors 62, 50 and 54 receive 2, 1 and 2, respectively, the flip-flop 55 contains signal 1 provided by the zero detector 5C in the previous cycle, and the flip-flop 57 retains 0.

In the fourth cycle, the address registers 18 and 20 contain addresses 105 and 107 of elements 4 and 5, respectively, the registers 24 and 26 contain 104 and 106, respectively, and the registers 25 and 27 contain addresses 101 and 103 for storing elements 2 and 6, respectively. The data registers 8 and 9 contain 1 and 7, respectively, and the registers 14 and 15 contain 2 and 6, respectively. The zero detectors 62, 50 and 54 receive zero, and the zero detector 62 outputs the total completion signal, the flip-flop 55 contains 0, and flip-flop 57 has its content becoming 1 derived from the contents of the flip-flop 55 in the previous cycle.

In the fifth cycle, the registers 24 and 26 contain 105 and 107, respectively, and the registers 25 and 27 contain addresses 104 and 106 for storing elements 7 and 1, respectively. The data registers 8 and 9 contain 4 and 5, respectively, and the registers 14 and 15 contain 7 and 1, respectively, due to the switching or change-over of operation by the content of the flip-flop 57. The flip-flop 57 retains 1.

In the sixth cycle, the registers 25 and 26 contain addresses 105 and 107 for storing elements 5 and 4, respectively, and the data registers 14 and 15 contain 5 and 4, respectively.

As a preparation for explaining the instruction shown in FIG. 1, the algorithm of bitonic sorting will be described in detail using FIG. 8.

Figure 8:
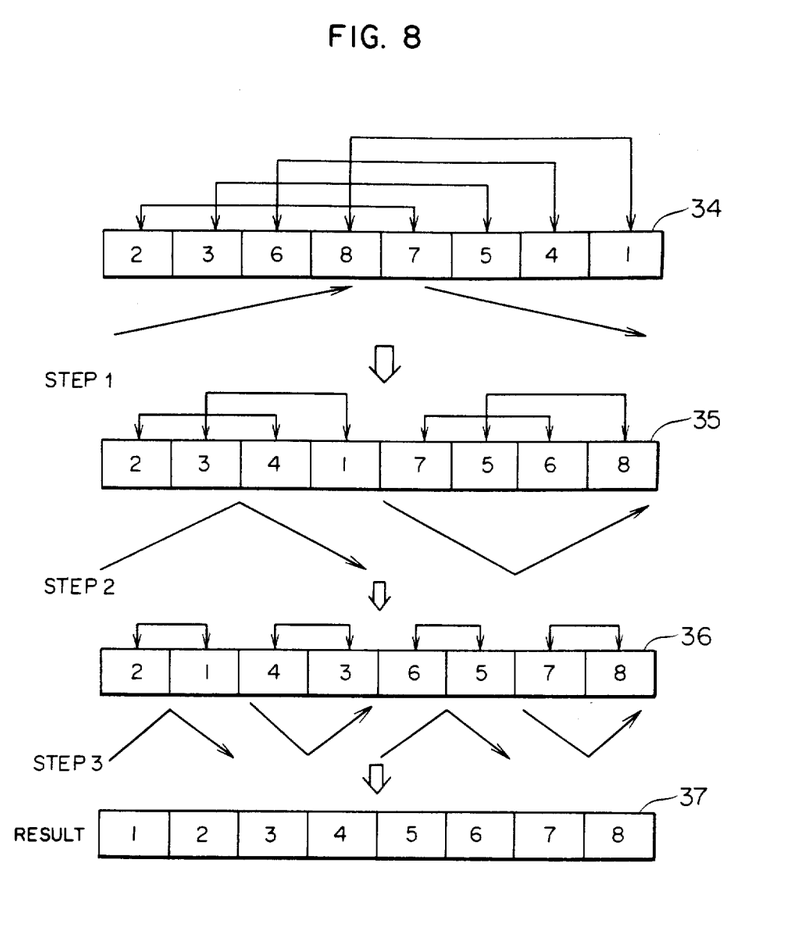
FIG. 8 is a diagram used to explain the fundamental algorithm of bitonic sorting.

In FIG. 8, symbols 34 through 37 denote vectors. For simplifying the explanation, the number of vector elements is assumed to be a power of two. FIG. 8 is an example of eight elements. The fundamental operation of bitonic sorting is that when a vector has its former half sorted in the ascending order and its latter half sorted in the descending order, as in the vector 34 of FIG. 8, or has its former half sorted in the descending order and its latter half sorted in the ascending order, the vector is divided at its center into two vectors and elements in pairs in correspondence as shown by the arrows over the vector 34 are replaced with each other depending on the result of comparison between the elements to make a replaced vector 35, or the operation opposite to that mentioned above takes place. The above fundamental operation is applied to the former half and latter half of the vector 35, resulting in a vector 36. The vector 36 is divided equally into four vectors, and the application of the fundamental operation to each divided vector results in a vector 37. The vector 37 is the final result of sorting. The explanation for the bent arrows drawn below the vectors will be given in the following. The arrows placed below the vector 34 indicate that the vector is in the ascending order or descending order. Specifically, the arrows placed below the vectors 34 and 35 indicate that the vector is initially in the ascending order and then turns to the descending order, or vice versa. The turning section from ascent to descent, or from descent to ascent is called "bitonic part".

The following describes the reason for the accomplishment of sorting through the repetition of the fundamental operation until the length of the bitonic part becomes unity. As seen in the transition from vector 34 to vector 35, of the case of bitonic sorting of vector 34, elements in the former half of vector 35 do not exceed any element in the latter half of 35. The same is true in each bitonic part in the transition of vector 35 to vector 36. Generally, execution of the fundamental operation brings about a discontinuity of magnitude at the bitonic part of the original vector. Accordingly, sorting is accomplished by repeating the fundamental operation until the bitonic part becomes unity.

In the general case of sorting a vector, the vector is initially partitioned into 2-element groups, and sorting is conducted in the ascending order of value for odd-numbered groups counted from the end and in the descending order for even-numbered groups. Subsequently, the intermediate result is partitioned into 4-element groups, and sorting is conducted in the ascending order of value for odd-numbered groups counted from the end and in the descending order for even-numbered groups. The same operation is repeated by partitioning the vector into 8-element groups, into 16-element groups, and so on, and finally the sorting result is reached. It should be noted that bitonic parts are not always so orderly as shown in FIG. 8, but instead ascents and descents are generally more random.

Figure 6:
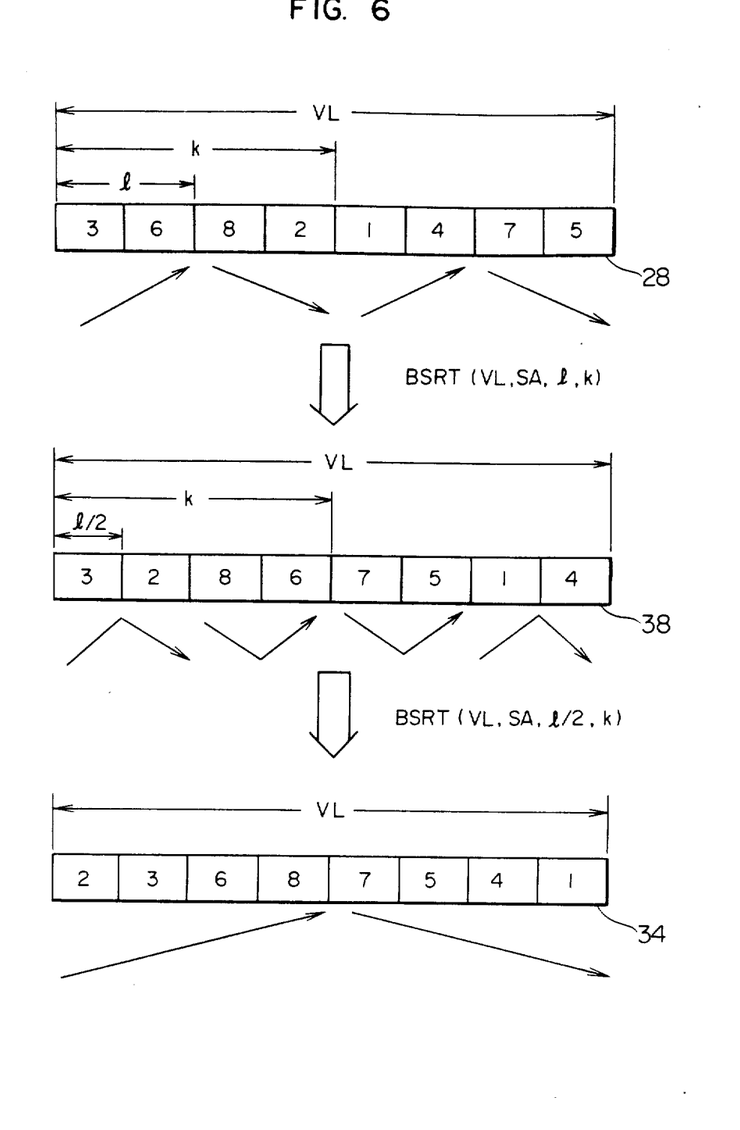
FIG. 6 is a diagram used to explain the sorting process by the bitonic sort instruction.

Processing of instructions dealt with in this embodiment will be explained using FIG. 6. In the figure, symbols 28, 38 and 34 denote vectors, and VL denotes the vector length. The instruction word in FIG. 1 is written as follows: BSRT (VL, SA, l, k). The sequence of vector processing shown is states on the way of bitonic sorting for a general vector. Shown in FIG. 6 is a transition of a vector which has been sorted for 2-element groups to a vector 34 which has been sorted for 4-element groups.

First, the item l of instruction BRST (VL, SA, l, k) for making vector 38 from vector 28 will be described. The bitonic part is divided equally into two parts, and each part will be called a "subvector". The vector 28 has a length of subvector, i.e., subvector length, of l, while the vector 38 has a subvector length of l/2. Next, the item k will be described. The item k represents the length of sorting section obtained as a result of repetition of the fundamental operation until the length of each bitonic part has become unity, and sorting is implemented in the ascending or descending order for each group of this length as seen in vector 34. This length will be called "target sorting length". Accordingly, the mode of application of the fundamental operation is reversed in every target sorting length. Namely, as seen in a transition from vector 28 to vector 38, or from vector 38 to vector 34, the fundamental operation for ascent sorting and the fundamental operation for descent sorting are applied alternately in every target sorting length.

The processing of instruction BSRT (VL, SA, l, k) will be described. The BSRT (VL, SA, l, k) instruction is processed by application of the fundamental operation for ascent sorting and descent sorting to bitonic parts in every target sorting length k, as seen in the transition from vector 28 to vector 38.

The method of sorting a general vector will be explained using FIG. 7. The values l and k used in FIG. 6 are constants, whereas values L and K used in FIG. 7 are variables representing a subvector length and target sorting length, respectively. In FIG. 7, step 40 is initial setting for the whole process, step 41 is initial setting for the minor loop, step 42 is execution of an instruction, step 43 is judgement for the end of the minor loop, step 44 is updating for the minor loop counter, step 45 is judgement for the total completion, and step 46 is updating for the major loop counter.

The flowchart of FIG. 7 will be described in detail in connection with FIG. 6. Step 40 initializes the target sorting length K to 2, and step 41 initializes the subvector length L to 1, so that bitonic parts are formed in 2-element pairs. Step 42 executes instruction BSRT (8, SA, 1, 2). As a result of instruction execution each pair of elements is sorted, and the vector 28 shown in FIG. 6 is produced. Step 43 checks the ending condition for the minor loop and in this case, where the subvector length L is 1, the sequence goes out of the minor loop and proceeds to step 45. Since the target sorting length K is not equal to the vector length VL, as detected by step 45, the sequence proceeds to step 46, in which the target sorting length K is set to 4.

Step 41 sets the subvector length L to 2, and step 42 executes the instruction. At this time vector 38 is produced from vector 28 in FIG. 6. Since the ending condition of step 43 is not satisfied, step 44 sets the subvector length L to 1 and step 42 executes the instruction. At this time, vector 34 is produced from vector 38 in FIG. 6, and the sequence goes out of the minor loop in step 43. Namely, the minor loop corresponds to FIG. 6, and this loop implements sorting up to the target sorting length K.

The total ending condition is not satisfied in step 45, and step 46 sets the target sorting length K to 8 and the sequence enters the minor loop by setting the subvector length L to 4 in step 41. At this time, the minor loop corresponds to the bitonic sorting process shown in FIG. 8. After the sequence has gone out of the minor loop, with the total ending condition being already met in step 45, the sequence comes to the end. The major loop in the flowchart of FIG. 7 implements the total sorting.

According to this embodiment of the invention, the working area is rendered unnecessary and the operation speed can be improved.

While a particular embodiment of the invention has been illustrated and described, it will be obvious to those skilled in the art that various changes and modifications may be made without departing from the present invention in its broadest aspects.

For example, an alternative system arrangement is possible through the provision of a plurality of general-purpose registers and the use of instructions, in which the VL part, SA part, l part and k part of the instruction word in FIG. 1 each designate their own general-purpose registers, so that the vector element length is preset in the general-purpose register designated by the VL part, the vector starting address is preset in the general-purpose register designated by the SA part, the increment switching parameter is preset in the general purpose register designated by the l part, and the operation switching parameter is preset in the general-purpose register designated by the k part.

We claim:

1. A vector processing system comprising:
    a main storage for storing vector instructions and vector data;
    an instruction register for holding an instruction read out of said main storage;
    a decoder for decoding the vector instruction held in said instruction register; and
    an execution means operative to implement a vector operation in response to an output of said decoder, including a facility which, when a sort instruction inclusive of a vector starting address, increment switching parameter and operation switching parameter has been set up in said instruction register, implements a sorting process specified by said instruction for vector data stored in said main storage, said facility comprising means in which said operation switching parameter is set and which produces an operation switching signal in compliance with the number of operations and the position of a vector element to be operated, means in which said increment switching parameter is set and which produces an increment switching signal in compliance with the position of the element to be operated, fetch/store address generating means in which said vector starting address and said increment switching parameter are set and which in compliance with said settings generates addresses of vector elements to be sorted for reading out and writing in said main storage successively in an incremental manner and generates said addresses with incremental value thereof being changed in compliance with said increment switching signal, and operation means which implements an operation for sorting vector elements read out of said main storage in complance with said operation switching signal, said facility implementing sorting for all elements of vector data to be sorted when said sort instruction is set up in said instruction register.

2. A vector processing system according to claim 1, wherein said sorting process facility comprises completion signal generating means which detects the completion of a sorting process for all elements of a vector to be sorted and produces a completion signal.

3. A vector processing system according to claim 1, wherein said sort instruction is to perform bitonic sorting.

* * * * *